Patented Dec. 4, 1934

1,982,822

UNITED STATES PATENT OFFICE 1,982,822

CONDENSATION PRODUCTS OF CARBOHYDRATE DERIVATIVES

Joseph V. Meigs, Dobbs Ferry, N. Y., assignor to Sweets Laboratories Inc., New York, N. Y., a corporation of New York No Drawing. Application August 26, 1929, Serial No. 388,606

18 Claims. (Cl. 260—2)

The present invention relates to the preparation of carbohydrate derivatives, including solvents, adapted for use in combination with cellulose esters or ethers or for other purposes.

Carbohydrates may be fermented to produce alcohols, e. g. butyl alcohol and ethyl alcohol. These alcohols do not, in themselves, possess the desired properties or degree of solvent power necessary to provide suitable solvents, plasticizers, etc. desirable in conjunction with cellulose esters and ethers. The present invention provides a process whereby one portion of carbohydrate material may be directly converted by an improved method into organic acids by a relatively rapid chemical reaction without resorting to fermentation methods, and these acids, so produced, then converted into new and improved products including solvents or diluents for cellulose esters, by combination with alcohols, the latter being produced from another portion of carbohydrate material by fermentation or biochemical treatment, or otherwise produced.

Cellulose esters, such for example as cellulose nitrate, or acetate, are of widespread importance in the preparation of quick drying varnishes or lacquers in the automobile and other industries, and the present invention provides furthermore a new and improved series of solvents by means of which the said esters may be applied.

The invention provides furthermore a new and improved lacquer comprising a cellulose ester dissolved in or used in conjunction with the said improved solvents.

The invention furthermore provides new and useful products adapted for numerous uses in the paint, varnish, lacquer and plastic fields.

The invention furthermore provides improved means by which the improved substances may be obtained from carbohydrate material by relying on the carbohydrate as the chief source of raw material instead of, for example, fermenting the carbohydrate to produce the alcohol and then combining this with organic acids produced from a different source of raw material, such as with phthalic acid obtained by the treatment of coal tar.

One of the objects of the invention is to provide means for increasing the consumption of agricultural, that is carbohydrate, material in the chemical industries and to this end the invention provides means whereby a cellulose ester lacquer may be prepared consisting entirely or for the most part of carbohydrate derivatives and possessing improved properties.

The invention furthermore provides improved means whereby low grade carbohydrate material, such as molasses and "hydrol" may be converted into valuable solvents. "Hydrol" is a syrupy material produced as a by product when dextrose is separated in solid or crystallized form from the liquors obtained by the hydrolysis of starch.

Broadly the invention comprises reacting a carbohydrate with an alkali to convert the carbohydrate into the desired organic acids and combining these acids with an alcohol.

In addition to the objects, advantages and other features recited above, the invention comprises such further objects, advantages and features of novelty and utility as are herein below described and/or claimed.

As an illustration of one method by which the invention may be practiced the following example is given:

Example I

Raw materials

A. Commercial dextrose or corn sugar having a composition as follows (approximately):

Percent by weight
Dextrose and/or reducing sugar_____ 84
Moisture_____ 11
Impurities_____ 5

B. Commercial caustic soda containing about 94% NaOH by weight

C. Commercial hydrochloric acid of specific gravity about 1.18–1.19

D. Commercial butyl alcohol

Dissolve 255 pounds of the caustic soda in 300 pounds of water and dissolve 420 pounds of the corn sugar in 150 pounds of water. Place the sugar solution in a jacketed digester provided with a stout heavy stirrer, an efficient fractionating column and a condenser leading from the top of the column and provided also with a reflux condenser, and add the alkali solution, in small portions, with stirring and if necessary with cooling, to the sugar solution so that the temperature of the mixed solutions remains below the boiling point of the mixture and preferably at about 50 degrees centigrade. The contact of alkali and sugar solution generates heat and it is advisable to proceed as indicated to prevent an unduly violent reaction. When all the alkali has been added, maintain the temperature of the contents of the digester at about 60 degrees centigrade for three hours, preferably stirring the contents during this time. The reflux condenser, cooled by water, may be used to prevent loss of water by volatilization. The action of the sodium hydroxide on the dextrose is believed to generate hydroxy organic acids containing three or more atoms of carbon, as for example lactic acid, in the form of the sodium salts of those acids.

In order to liberate the organic acids from their sodium salts, add slowly to the reaction product a quantity of hydrochloric acid equivalent chemically to the amount of NaOH used and 60 pounds of hydrochloric acid in excess, together with 250 pounds of butyl alcohol. The butyl alcohol may be obtained by known methods by the fermentation of carbohydrate material.

The hydrochloric acid performs several functions. It liberates the organic acids from their salts, it provides free hydrochloric acid to act as a catalyst and it generates sodium chloride which also assists or catalyzes the subsequent combination of the organic acids and alcohol to be added. Now heat the digester and subject the contents thereof to a slow distillation with continuous stirring to eliminate water and to unite the alcohol with the organic acids produced by the reaction between the alkali and the dextrose and to retain the products of the union, or esters, in the digester. The rate of distillation of water should be about 2 pounds per minute until the free water present is removed by distillation.

Continue distillation until substantially no further evolution of water takes place. The continuous removal of water tends to promote complete conversion of the organic acids into the butyl esters and this conversion is assisted by the free hydrochloric acid added as catalyst, and in addition by the sodium chloride formed by adding hydrochloric acid to the product of the action of sodium hydroxide on the dextrose. Instead of the continuous removal of water by distillation as described, alternate refluxing and distillation may be employed.

The continued and exhaustive distillation hereinabove described has however a function in addition to the mere removal of water as between alcohol and organic acids to bring about union thereof. This further function is the condensation of the said compound of alcohol and organic acids to convert the said compound into products having improved properties in respect of resistance to or insolubility in water, or increased viscosity, increased boiling range and decreased volatility.

When the evolution of water is found to be substantially complete, cool the residue in the digester and then extract the residue with hot ethyl alcohol by agitating the residue with the ethyl alcohol. Separate the alcoholic extract from the residue insoluble in alcohol and finally remove the ethyl alcohol from the extract by fractional distillation. The extraction separates the esters from the sodium chloride and the latter constitutes a by-product.

Instead of extracting the esterified product with alcohol, the said product may be washed with water to remove the sodium chloride, in which case the esterified product is the washed material and the sodium chloride is found in the aqueous extract.

The esterified product comprises bodies of varying degrees of volatility and may contain free butyl alcohol. It is preferably subjected to distillation under reduced pressure in a distilling apparatus provided with a fractionating column, to produce fractions having different boiling ranges, different compositions and different degrees of volatility.

Instead of dextrose, other carbohydrates may be employed, as for example sucrose, molasses, invert sugar, levulose, starch and other carbohydrates. In the employment of starch this may be hydrolyzed by known methods and the hydrolyzed product heated as herein described. The monoses appear to require less drastic treatment than the polyoses and are preferred.

Instead of sodium hydroxide, other alkalis may be used, as for example potassium hydroxide, barium hydroxide, and other fixed alkalis. Thus, sucrose may be heated with 1.2 times its weight of crystallized barium hydroxide in the form of a 2.5 normal solution for three hours under pressure at 200 degrees centigrade. The cooled solution may then be treated with the theoretical quantity of sulphuric acid required to convert the barium into its sulphate and the latter separated by filtration. To the resulting filtrate containing the organic acids liberated from their barium salts by the sulphuric acid the desired alcohol, such as amyl alcohol in quantity equal to the weight of sucrose taken, and a catalyst, such as concentrated sulphuric acid equal in weight to 10 per cent of the weight of sugar employed, may be added and the reaction brought about as described in the above example.

Various catalysts may be used instead of hydrochloric acid to assist in reacting the organic acids with the desired alcohol, such as sulphuric acid, aluminum chloride or zinc chloride, and these may be used in proportion varying from 1 to 10 per cent of the weight of carbohydrate originally employed.

During the treatment of the carbohydrate with alkali, the nature of the organic acids produced thereby may be varied by applying oxygen, as such or in the form of an oxidizing agent, and reacting it with the other substances. Thus air or oxygen may be bubbled through the reacting substances and various other oxidizing agents may be employed.

Various alcohols may be used instead of butyl alcohol and the proportion thereof may vary from that specified hereinabove in the case of butyl alcohol according to the molecular weight thereof. Such other alcohols may comprise, for example, methyl and ethyl alcohols, isopropyl alcohol, amyl alcohol, benzyl alcohol, furyl alcohol, ethylene gycol, diethylene gycol, diethylene glycol monoethyl ether, glycerine.

Inasmuch as some of these alcohols, in addition to butyl alcohol, may be produced by the fermentation of starches, sugars and the like, it will be observed that the invention provides means of producing new and useful products by relying on carbohydrates as the chief source of raw material entering into the production thereof, and the invention includes the combination of steps which comprises treating a carbohydrate such as starch with a ferment, generating thereby an alcohol, such as butyl alcohol for example, by known methods, reacting another portion of carbohydrate material, such as dextrose, with an alkali and proceeding as herein described to produce organic hydroxy acids and then combining the said acids with the said alcohol, as described, to produce the union or compound of alcohol and organic hydroxy acids.

As a further step in the production of an improved product, the invention provides a further treatment of the product produced by the combination, with an alcohol, of the organic acids formed by reaction between the carbohydrate and an alkali.

This further step comprises a heat-treatment applied to the compound of alcohol and organic acids to effect a condensation of said compound.

In some cases, as for example where glycerine or ethylene glycol or diethylene glycol or other polyhydric alcohols are employed, condensation of the union or compound of alcohol with the organic acids produced from the carbohydrate may, if carried to completion, that is, until water ceases to be evolved, produce a product having a resinous character, or a product the viscosity of which is very high. In such case the purification of the product as by extraction with alcohol or water as hereinabove described may be difficult.

In such circumstances instead of carrying the distillation as far as described above in the specific example which related to the use of butyl alcohol, it is desirable to interrupt the process when the distillation of water becomes greatly retarded, but prior to the point where undue thickening of the reaction mixture sets in, and to separate the reaction product at that point into two portions, viz. water insoluble and water soluble portions, as by washing with water.

The water insoluble portion represents what may be termed a potentially reactive substance in that it may be susceptible to further chemical change by applying further condensing treatment, as for example by heating it, alone or with condensing agents, until the desired degree of water elimination or condensation takes place. This may be done by a simple distillation at atmospheric pressure or by distillation at superatmospheric pressure. It may also be done by heating under pressure without distillation and with or without condensing agents, as for example anhydrous zinc or aluminum chloride or phosphorus chloride. With higher boiling compounds, distillation in vacuo may be used. The herein described compounds of alcohols and hydroxy acids, particularly the higher boiling or solid compounds, when employed in conjunction with cellulose esters provide among other advantages a combination possessing an increased degree of adhesion to surfaces.

As an example of the preparation of a lacquer the following is given:

Example II

| | |
|---|---|
| Cellulose nitrate (½ second viscosity) | 20 grams |
| Product produced as per Example 1 above without separation thereof into fractions by fractional distillation | 20 grams |
| Butyl acetate | 50 cc. |
| Ethyl acetate | 50 cc. |
| Ethyl alcohol | 65 cc. |

Since butyl acetate, ethyl acetate and ethyl alcohol may all be produced from carbohydrate material, it will be noted that all constituents of the above lacquer excepting the nitrate radical of the cellulose nitrate may be derived from carbohydrate raw material. Moreover, all or a portion of the cellulose nitrate may be replaced by cellulose acetate.

The advantage of employing the sugars, e. g. monoses, to react with alkalis is that the reaction may be carried out under relatively mild conditions as described herein to produce organic hydroxy acids of such a character that compounds or esters thereof may be produced having high boiling points and other properties that make them useful as high boiling solvents or plasticizers, or compounds that owing to their structure are potentially reactive as herein described and capable of condensation, as by heat, to produce highly viscous or resinous products. The hydroxy acids produced as hereinabove described may comprise lactic acid, dihydroxy butyric acid, or saccharinic acids (the latter being acids containing six carbon atoms and having a plurality of hydroxy groups), hydroxy valeric acid and other hydroxy acids containing three or more atoms of carbon.

The preferred carbohydrates of the present invention are those that will react with alkalis, as for example solutions of the alkali or alkaline earth hydroxides, to yield hydroxy acids containing three or more carbon atoms.

The foregoing description is intended to teach the principles and scope of the invention and to set forth a clear and concise method by which it may be practiced. It is understood that other methods embodying the invention may be employed without going beyond the scope of the invention or departing from the teachings thereof.

What I claim is:

1. The process which comprises reacting a carbohydrate with an alkaline solution, generating monobasic organic acids containing more than three carbon atoms neutralizing the alkaline solution with a mineral acid, thereby liberating said organic acids and producing an inorganic salt, adding a mineral acid in excess and an alcohol and distilling the acid solution in the presence of said mineral acid and inorganic salt until water ceases to be substantially evolved.

2. The process of producing synthetic resin which comprises reacting a carbohydrate with an alkaline solution to produce monobasic organic acids containing more than three carbon atoms and reacting said organic acids with a polyhydric alcohol to produce a resinous product.

3. The process of producing a synthetic resin which comprises reacting a carbohydrate with an alkali to produce monobasic organic acids containing more than three carbon atoms and combining said acids with a polyhydric alcohol to produce a resinous product.

4. The process of producing a synthetic resin which comprises reacting a sugar with an alkali to produce monobasic organic acids containing more than three carbon atoms and combining said acids with a polyhydric alcohol to produce a resinous product.

5. A synthetic resin comprising the reaction product of a polyhydric alcohol and the monobasic organic acids containing more than three carbon atoms resulting from decomposition of a carbohydrate by an alkaline hydroxide.

6. A substantially water insoluble condensation product of an alcohol and saccharinic acid.

7. A substantially water insoluble material comprising the reaction product of an alcohol and the organic acid reaction product of an alkali and a carbohydrate, said acid reaction product containing monobasic acids having more than three carbon atoms.

8. A substantially water insoluble resinous material comprising the reaction product of an alcohol and the organic acid reaction product of an alkali and a carbohydrate, said acid reaction product containing monobasic acids having more than three carbon atoms.

9. A substantially water insoluble material comprising the reaction product of a polyhydric alcohol and the organic acid reaction product of an alkali and a carbohydrate, said acid reaction product containing monobasic acids having more than three carbon atoms.

10. A resinous material comprising the reaction product of an alcohol and the organic acid reaction product of an alkali and a sugar, said acid reaction product containing monobasic acids having more than three carbon atoms.

11. A resinous material comprising the reaction product of a polyhydric alcohol and the organic acid reaction product of an alkali and a sugar, said acid reaction product containing monobasic acids having more than three carbon atoms.

12. The process which comprises reacting a carbohydrate with an alkali to produce an acid reaction product containing monobasic acids having more than three carbon atoms and reacting said product with an alcohol to produce a substantially water insoluble product.

13. The process which comprises reacting a sugar with an alkali to produce an acid reaction product containing monobasic acids having more than three carbon atoms and reacting said product with an alcohol to produce a substantially water insoluble product.

14. The process which comprises reacting a carbohydrate with an alkali to produce an acid reaction product containing monobasic acids having more than three carbon atoms and reacting said product with a polyhydric alcohol to produce a synthetic resinous material.

15. The process which comprises reacting a sugar with an alkali to produce a reaction mass containing the salts of saccharinic acids, neutralizing the alkali to liberate said acids, heating the acids with an alcohol whereby water is set free by chemical reaction and continuing the application of heat until water ceases substantially to be evolved.

16. The process which comprises reacting a sugar with an alkali to produce saccharinic acids, heating said acids with an alcohol to effect an esterification and further heating the ester to eliminate water by chemical reaction and continuing the heating until water ceases to be substantially evolved.

17. The process of resinifying saccharinic acids which comprises heating these acids with an alcohol to produce an esterification and continuing the application of heat unitl a substantially water insoluble product is produced and until water ceases to be substantially evolved.

18. The process of converting sugar into a substantially water insoluble, volatile product which comprises reacting the sugar with an alkali to produce a saccharinic acid product, subjecting this product to heating in the presence of a high boiling alcohol to cause esterification and continuing said esterified production by the application of heat to cause the removal of additional water.

JOSEPH V. MEIGS.